United States Patent [19]

Noble et al.

[11] 4,392,078

[45] Jul. 5, 1983

[54] ELECTRON DISCHARGE DEVICE WITH A SPATIALLY PERIODIC FOCUSED BEAM

[75] Inventors: Milton L. Noble, Liverpool; Bryan L. Cleaveland, Baldwinsville, both of N.Y.

[73] Assignee: General Electric Company, Syracuse, N.Y.

[21] Appl. No.: 214,917

[22] Filed: Dec. 10, 1980

[51] Int. Cl.³ .............................................. H01J 25/00
[52] U.S. Cl. .......................................... 315/4; 315/3; 315/5; 315/5.35
[58] Field of Search ................. 315/3, 4, 5, 5.35, 5.38, 315/5.31

[56] References Cited

U.S. PATENT DOCUMENTS

| | | | |
|---|---|---|---|
| 3,013,173 | 12/1961 | Sturrock | 313/84 |
| 3,102,211 | 8/1963 | Sturrock | 315/5.31 |
| 3,129,356 | 4/1964 | Phillips | 315/39.3 |
| 3,188,518 | 6/1965 | Phillips | 315/39 |
| 3,206,635 | 9/1965 | Phillips | 315/39 |
| 3,218,503 | 11/1965 | Adler | 315/3 |
| 3,234,427 | 8/1966 | Orthuber | 315/4 |
| 3,252,104 | 5/1966 | Gordon | 315/3 X |
| 3,259,786 | 7/1966 | Phillips | 315/3 |
| 3,329,915 | 7/1967 | Meyerer | 335/210 |
| 3,398,376 | 8/1968 | Hirshfield | 315/5 |
| 3,463,959 | 8/1969 | Jory et al. | 315/5 |
| 3,787,747 | 1/1974 | Scott | 315/3.5 |
| 3,822,410 | 7/1974 | Madey | 331/94.5 |
| 3,916,246 | 10/1975 | Preist | 315/5 |
| 4,199,709 | 4/1980 | Alirot et al. | 315/4 |

FOREIGN PATENT DOCUMENTS 52-44156  4/1977  Japan ..................... 315/4

OTHER PUBLICATIONS

"Fast-Wave Interaction With a Relativistic Electron Beam" by P. Sprangle (Cornell U.) *Journal of Plasma Physics* (1974) vol. 11, Pt. 2, pp. 299-309.
"Stimulated Emission of Bremestrahlung in a Periodic Magnetic Field," J. M. J. Madey *Journal of Applied Physics*, vol. 42, No. 5, Apr. 1971, pp. 1906-1913.
Infrared and Millimeter Waves, vol. 1 Sources of Radiation, Ed. K. J. Button, National Magnet Laboratory, MIT, Cambridge, Mass., pp. 1-3.
"New Experimental Tests of Free-Electron Lasers", *Laser Focus* Aug. 1980, pp. 72-76.
General Electric Company Brochure, pp. 4-9 "Ubitron" Bulletin.
"The Ubitron, a High-Power Traveling-Wave Tube Based on a Periodic Beam Interaction in Unloaded Waveguide", RM Phillips, *IRE Trans. on Electron Devices, Oct. 1960, pp. 231-241*.

*Primary Examiner*—Saxfield Chatmon, Jr.
*Attorney, Agent, or Firm*—Richard V. Lang; Carl W. Baker

[57] ABSTRACT

The invention relates to an electron discharge device in which radio frequency energy is generated or amplified by high speed electrons traveling in a beam along the axis of a waveguide and subjected to a periodic magnetic field. The periodic field causes the electrons to travel in periodic orbits producing electromagnetic energy. When suitably adjusted, the energy in the beam is converted into electromagnetic energy of a given frequency. The device herein disclosed has an improved magnetic structure for causing the beam to travel in a helical path and for focusing it as it pursues this path. The helical path is produced by a static, spatially circularly polarized transverse field. Focusing of the beam is achieved by a pair of similar helically disposed axial magnetic fields having mutually opposite polarization. The fields are created by a plurality of short permanent magnets with cooperating pole pieces for directing the magnetic fields into the waveguide, and disposed in four rows arranged about the perimeter of the waveguide.

10 Claims, 9 Drawing Figures

+X̂ IS INTO PAPER

-X̂ IS OUT OF PAPER

FIG. 5A

FIG. 5B (SECTION VIEW 4A1)

LOCUS OF BEAM CENTER

FIG. 5C (SECTION VIEW 4A2)

FIG. 6

FIG. 7
MAGNETIC FIELDS IN PLANES ORTHOGONAL TO Z AXIS

0° PHASE

135° PHASE

45° PHASE

180° PHASE

90° PHASE x – INTO PAPER
o – OUT OF PAPER

ELECTRON DISCHARGE DEVICE WITH A SPATIALLY PERIODIC FOCUSED BEAM

BACKGROUND OF THE INVENTION

1. Field of the Invention

The invention relates to electron discharge devices in which radio frequency energy is generated or amplified by high speed electrons traveling in a beam along the axis of a waveguide and subjected to a periodic magnetic field. The periodic magnetic field causes the electrons to travel in periodic orbits in which electromagnetic energy is radiated. With suitable adjustments of the parameters of the system, energy in the beam is converted into electromagnetic energy of a given frequency. The invention also relates to an improved magnetic structure for deflecting the beam and focusing it in such electron discharge devices.

2. Description of the Prior Art

Electron discharge devices of the type described above have taken a variety of forms, have been given a variety of names, and have been subjected to differing analyses in the literature.

A survey of this class of devices was undertaken by J. Mark Baird in a talk given at the December, 1979 IEEE International Electron Devices Meeting held at Washington, D.C. The resulting paper, which was entitled "Survey of Fast Wave Tube Developments" contained a bibliography of over 40 citations (CH1504-0/79/0000-0156500.75 c 1979 IEEE).

An article appearing in the IEEE (IRE) Transactions on Electron Devices, October 1960, pages 231–241, entitled "The Ubitron, a High Power Traveling Wave Tube Based on a Periodic Beam Interaction in Unloaded Waveguide", by R. M. Phillips, describes a related device. In the device described in the Phillips' article, an electron is subjected to a periodic transverse magnetic field causing the beam to follow a sinuous path. The periodic magnetic field is produced by magnetic means referred to as an "undulator". In the Phillips' article, the device has been analogized to a traveling wave tube, modified in the use of a fast wave rather than a slow wave interaction.

An article dated April, 1971, Journal of Applied Physics, Vol. 42, No. 1, pages 1906–1913, entitled "Stimulated Emission of Bremsstrahlung in a Periodic Magnetic Field" by John M. J. Madey, also treats a related device. The device analyzed employs an array of magnets to produce a circularly polarized magnetic field, which induces a helical shape in an electron beam. Somewhat similar principles have been employed in another arrangement described by Madey in which bifilarly wound helical electromagnets also produce a helical electron beam. Superconducting techniques were used in the later arrangement to achieve the high currents necessary to produce adequate transverse fields. The above Madey implementations have been used to generate energy at infrared and optical wavelengths, using electron beams with energies in the megavolt range. In a Madey U.S. Pat. No. 3,822,410, disclosing a related device, the production of energy in the infrared, optical, ultraviolet and X-ray regions was suggested. The Madey devices, due to their higher frequencies, use optical resonator techniques rather than waveguide techniques to transfer the electromagnetic energy. Since the beams employed are highly energetic, focusing in the interaction structure has been unnecessary.

Devices exemplified by the Madey reference operate at such high electron velocities that defocusing of the beam is not significant. In devices adapted for use at lower voltages, such as the Phillips "Ubitron", defocusing does occur in the interaction structure as a result of the lower velocity of the electrons and space charge effects. If the interaction structure is prolonged, focusing is essential to efficient operation.

It has been proposed to characterize the devices treated above by the term "free electron LASER". The term "LASER" (Light Amplification, Stimulated Emission Radiation) has ordinarily been reserved to devices operating with electromagnetic waves in the visible or near visible (IR) portions of the spectrum.

The device herein treated bears a significant theoretical similarity to a LASER taking into account the theoretical analogy between a microwave resonant structure and an optically resonant structure, but differs in the practical ways of handling the resultant electromagnetic radiation. In the sense herein intended, the term "free electron LASER" is applied to devices in which the practical application is in generation of waves in the millimeter or sub-millemeter region of the electromagnetic spectrum.

SUMMARY OF THE INVENTION

Accordingly, it is an object of the invention to provide an improved electron discharge device in which high speed electrons subjected to a periodic magnetic field pursue a spatially periodic path in a waveguide, deceleration of the electrons producing electromagnetic energy of a given frequency.

It is another object of the invention to provide an electron discharge device having an improved means for causing electrons to pursue a spatially periodic path.

It is still another object of the invention to provide an electron discharge device having an improved means for causing the electrons to pursue helical paths.

It is an additional object of the invention to provide an electron discharge device having an improved means for focusing electrons pursuing helical paths.

It is another object of the invention to provide an electron discharge device having an improved magnetic structure for causing electrons in a beam to pursue helical paths and for focusing the beam.

These and other objects of the invention are achieved in an electron discharge device in which high speed electrons in a beam, subjected to a spatially periodic magnetic field, pursue helical paths, the deceleration of the electrons producing electro-magnetic energy at a given frequency.

The inventive combination comprises a waveguide, an electron gun, means for deflecting the electrons into a helical path, and novel focusing means. The waveguide has a given phase velocity for waves of the given frequency and a low frequency cut-off, below the given frequency. The electron gun projects a beam of electrons along the axis of the waveguide at a velocity which is slow enough such that the beam is subject to defocusing from space charge and other effects.

The electrons are caused to pursue spatially periodic paths by means for producing a static spatially circularly polarized transverse magnetic field extending across the interior of the waveguide, the transverse field vector rotating about the waveguide axis at a given pitch. The magnetically imposed electron paths have a pitch equal to that of the transverse field but they are mutually displaced by one-quarter revolution. Necessarily, the electron velocities, the spatial periodicity of the helical paths, and the waveguide parameters are selected to cause continuing axial deceleration of the electrons and a corresponding axial increase in electromagnetic energy of the given frequency in the waveguide.

The beam is focused by magnetic means which produce a first and a second static spatially circularly polarized axial magnetic field, each field rotating about the waveguide axis at a pitch equal to that of the transverse field and of the helical electron paths. The first circularly polarized axial field has a polarization opposite to that of the second circularly polarized axial field, the two circularly polarized axial fields are intertwined and disposed at mutually opposite positions across the axis of the waveguide to cause the maximum axial field at a given axial coordinate to assume opposite senses at opposite points on the perimeter of the waveguide and a zero value on the waveguide axis. Electrons at a given axial coordinate share a common transverse vectorial velocity, attributable to the transverse field in which the axial field. Those electrons lying in two opposite sector shaped portions of the beam in which the axial field is maximum, are subject to the maximum of an inward deflecting force.

For effective focusing, the axial field must have the correct rotational sense in relation to the electron paths. When the relative sense is correct, the "maximum" deflecting force on the electrons is optimized and inwardly directed for electrons in the two opposite sectors of the beam. Since off-axis electrons in all sectors of the beam are periodically exposed to this maximum inwardly directed force as the beam progresses along said axis, all electrons in the beam experience periodic maximum focusing forces, and beam impingement on the interior of the waveguide is substantially prevented and the beam focused.

In accordance with another aspect of the invention, the means for producing the circularly polarized transverse and axial magnetic fields is a plurality of magnetic elements disposed about the perimeter of the waveguide and in axial succession, sufficient in number to produce a plurality of revolutions in the helical electron paths.

Preferably, the rows of magnetic elements are even in number, four being of greatest convenience. More particularly, each of the magnetic elements comprises one of a plurality of magnetic poles arranged in four axially extending rows disposed about the perimeter of the waveguide. The poles in each of the rows are arranged in an alternating succession of polarities, the poles of a first row being axially aligned opposite poles in a third row having mutually opposite polarities, and the poles in a second row being axially aligned opposite the poles in the fourth row having mutually opposite polarities. The transverse magnetic field is supported by poles disposed at mutually opposite positions across the axis and the axial field is supported by flux between adjacent poles in a common row.

Continuing, when the poles in the second and fourth rows are arranged at axial coordinates intermediate to those of the poles in the first and third rows, dependent on the sense of the offset, the transverse field vector assumes a clockwise or counterclockwise rotation about the waveguide axis and the first and second axial fields assume similar clockwise or counterclockwise rotations about the waveguide axis.

In achieving the foregoing fields, a preferred arrangement is one in which the magnetic elements in each row consist of an alternating sequence of permanent magnets and pole pieces. The magnets have their poles aligned parallel to the waveguide axis and in an alternating sense, while the pole pieces direct the flux from the magnets into the adjoining waveguide. In each row, the sequence of magnetic elements commences and ends with a pole piece. Also, the magnets and pole pieces in each row substantially occupy a quadrant whose center is the axis of the waveguide, with the inner surfaces of the pole pieces and magnets being substantially coplanar and in close proximity to the exterior of the waveguide. At the same time, the non-inner surfaces of the pole pieces are set back within the outlines of the magnet to reduce the amount of unused axial leakage flux at non-inner surfaces. This configuration reduces the leakage of axial flux outside of the waveguide and increases the axial flux flowing within the proximate interior of the waveguide.

In addition, means are provided to gradually increase the transverse and axial fields in proximity to the electron gun, from zero nearest the gun, to the steady state value several magnetic periods along the device, to minimize turbulence of the electron beam. This is achieved by the provision of graduated magnetic shunts on the non-inner surfaces of the magnets in proximity to the electron gun.

BRIEF DESCRIPTION OF THE DRAWINGS

The novel and distinctive features of the invention are set forth in the claims appended to the present application. The invention itself, however, together with further objects and advantages thereof, may best be understood by reference to the following description and accompanying drawings in which:

DESCRIPTION OF THE PREFERRED EMBODIMENT

Figure 1:
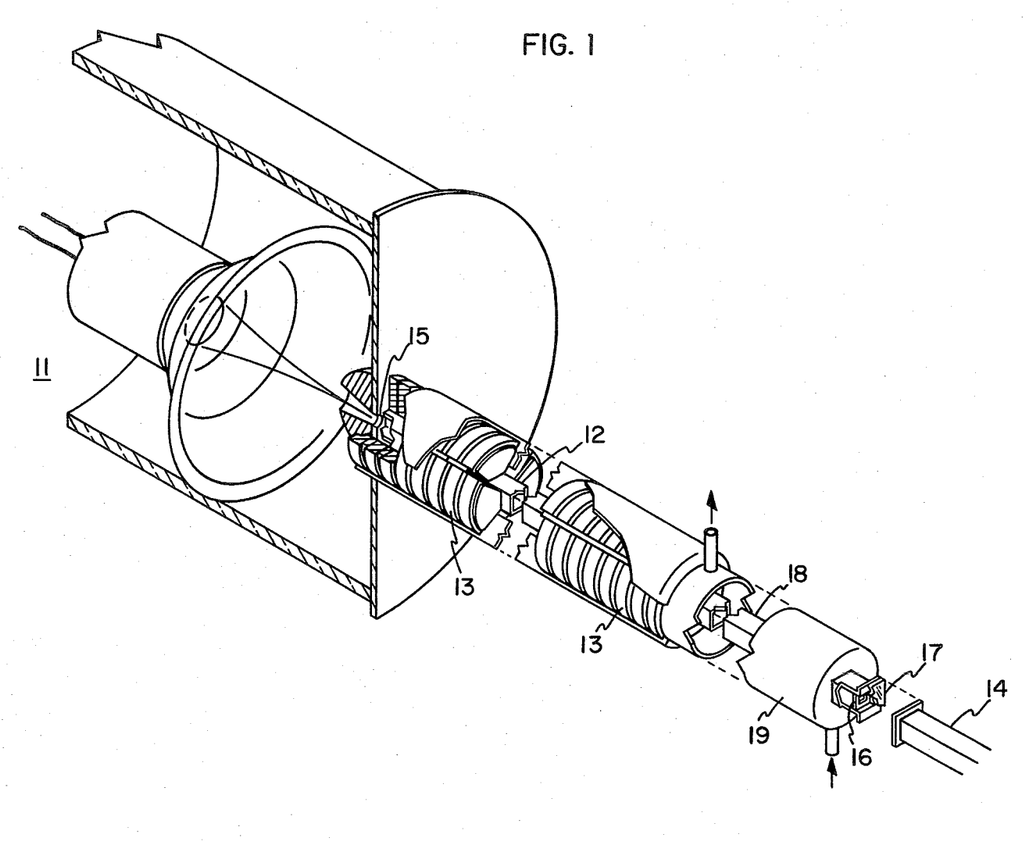
FIG. 1 is a cut-away perspective view of a novel free electron laser oscillator incorporating an improved periodic permanent magnet structure.

Referring now to FIG. 1, a novel free electron laser oscillator is shown in a cut-away perspective view incorporating an improved periodic permanent magnet structure. The illustrated free electron LASER is of a type suitable for operation in the range of from 10 to 100 GHz, the embodiment more particularly described being suited for operation at about 35 GHz at kilowatt power ranges.

The free electron LASER shown in FIG. 1 is designed to convert the energy present in an electron beam to electromagnetic energy. The free electron LASER comprises an electron gun 11, producing a high energy (50-100 KV at currents up to several amperes or more) beam, which is the source of input energy; a waveguide 12 having a cross-section suitable for propagation of a circularly polarized wave; and the novel, periodic permanent magnetic structure 13. The magnetic structure produces a first circularly polarized transverse magnetic field causing an approximately helical motion of individual electrons in the beam. Simultaneously, the magnetic structure produces a second group of axial fields lying along the inner surfaces of the waveguide. The axial field may be regarded as formed of two intertwined spiral fields, one oppositely polarized with respect to the other for periodically focusing the helically deflected electrons to maintain high current density and generally prevent the beam from impinging on the waveguide. The beam enters the waveguide 12 through a tunnel 15 at the electron gun end of the waveguide. The tunnel 15 is small enough to be cut-off for the electromagnetic waves generated within the waveguide, and long enough to prevent energy leakage into the gun structure. Electromagnetic energy generated in the waveguide exits through an iris 16 at the vacuum window 17 at the end of the waveguide remote from the electron gun. The iris 16 is dimensioned to allow the transmission of generated energy to the output waveguide (14) while at the same time reflecting a percentage of the energy back into the waveguide 12 to provide enough regenerative feedback to sustain oscillations. Finally, electrons which have traversed the interaction region are collected on the walls of the waveguide in region 18. The beam collection means may include a magnetic beam deflector (not illustrated) to insure that all electrons impinge on the side walls and are collected. A water cooler 19 encircling the collection region 18 is provided to dissipate the heat generated by electron impingement.

Figure 2:
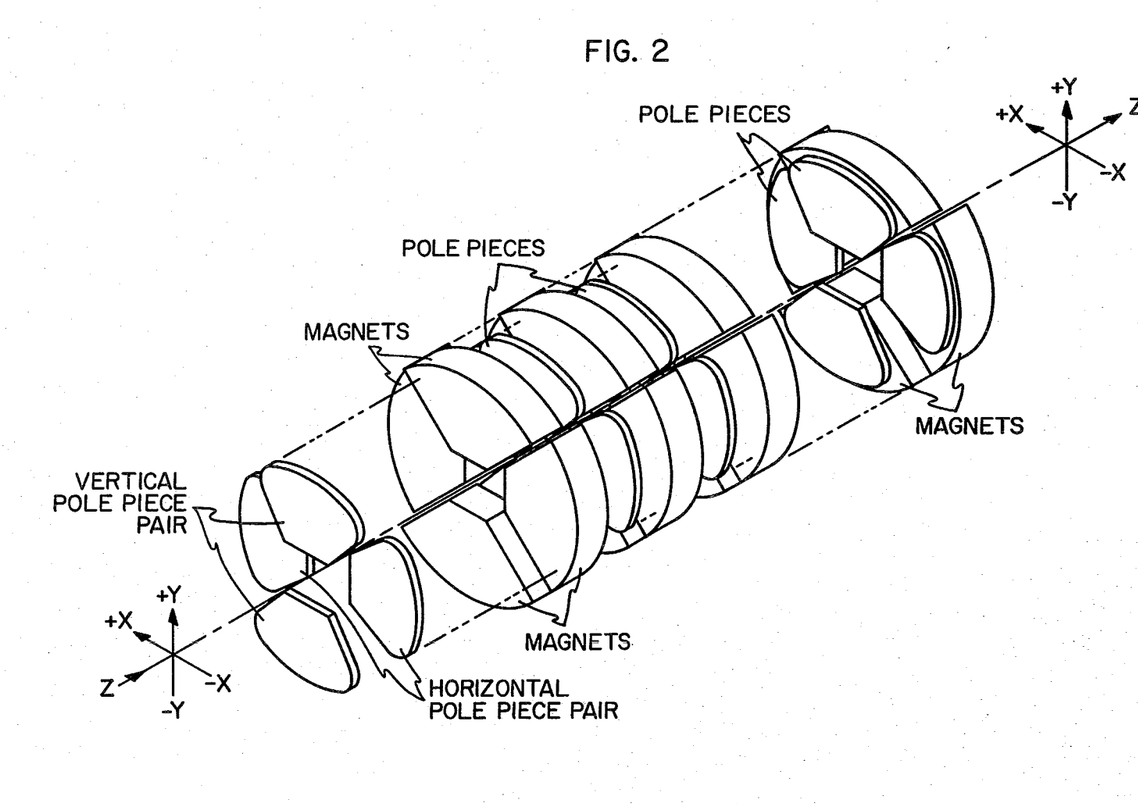
FIG. 2 is an illustration of the novel magnet structure including both magnets and pole pieces, shown in an axially expanded disposition.

The foregoing free electron laser has the following approximate dimensions for a 35 gHz embodiment. It is approximately 80 cm long having the first 20 cm devoted to the electron gun 11, the next 30 cm devoted to the periodic magnetic structure 13 and the next 30 cm devoted to the electron collection region 18 and the rf output coupling flange. The waveguide 12 has an approximate 5 mm×5 mm internal dimension and the magnetic structure 13 is arranged with a 6 mm internal dimension and a 7 mm periodicity measured along the axis of the waveguide. FIG. 2 illustrates the permanent magnet structures in an axially expanded disposition. The magnetic structure consists of four rows of sector shaped magnets and pole pieces occupying a "quadrant". In each row, the magnets and pole pieces are stacked alternately, with each row commencing and ending with a pole piece. The magnets are the source of the transverse and axial magnetic fields and the pole pieces the means for directing the fields into the waveguide. One opposite pair of rows (e.g., the vertical pair at $+Y, -Y$ positions) is axially offset with respect to the other opposite pair of rows (e.g., the horizontal pair at $+X, -X$ positions) by one-half the thickness of one magnet plus one pole piece. As will be explained, this construction amounts to a 90° offset in the axial magnetic period of one opposite pair of rows with respect to the other opposite pair of rows and permits one to form circularly polarized magnetic fields. The electron beam is 1-2 mm in dimater at the tunnel 15 where it enters into the microwave cavity and the tunnel diameter is made slightly larger than the beam, to avoid interception of the beam.

Figure 3:
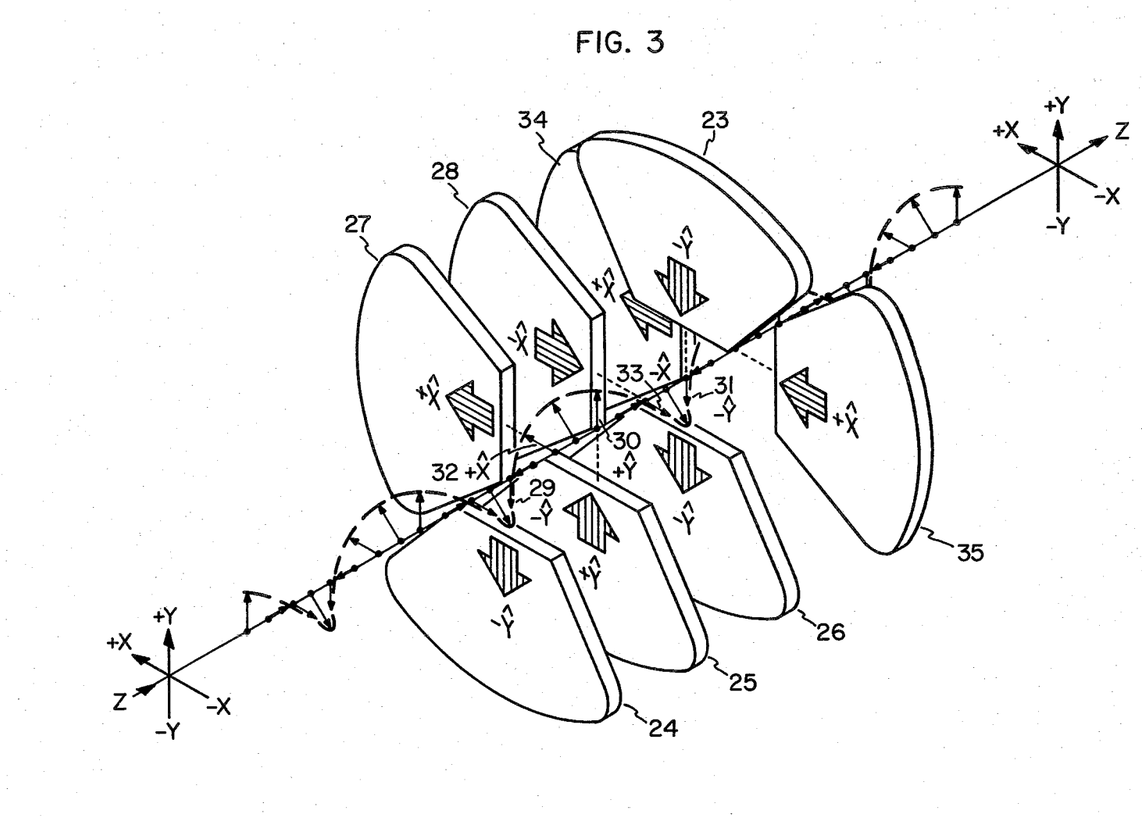
FIG. 3 is a perspective drawing showing selected pole pieces instrumental in producing a circularly polarized transverse magnetic field, and an illustration of the transverse magnetic fields created.
Figure 4:
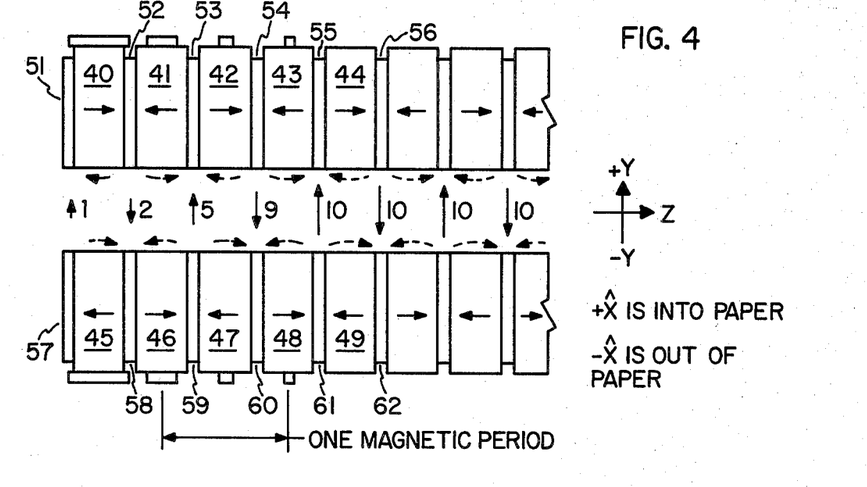
FIG. 4 is an illustration of a vertical section of two oppositely situated rows of elements in the magnetic structure illustrating both the magnets, the pole pieces, the shunts for tapering the field at the beam entrance iris, and the axial and transverse magnetic fields created.

The novel periodic permanent magnet structure is further illustrated in FIGS. 3 and 4. In FIG. 3, a perspective drawing is shown of the righthand circularly polarized transverse magnetic field together with certain pole pieces instrumental in creating this field. The magnetic field is illustrated progressing along the Z (or waveguide) axis for a distance of about four magnetic periods. In the view, eight pole pieces spaced over one and a quarter magnetic periods are shown. For simplicity in illustration, certain front and upper pole pieces, the permanent magnets, and the waveguide (which lies within the pole pieces), have been omitted from FIG. 3. The waveguide axis is shown as a solid line extending in a direction marked "Z" at the right and left limits of the figure. The vertical direction is marked "Y" and the horizontal didirection is marked "X". A dotted line defined by the head of an evenly spaced succession of rotating arrows (e.g., at 45° spatial phase intervals) is used to illustrate the Z dependent rotation of the circularly polarized transverse magnetif field. The illustrated rotation of the transverse magnetic field vector is in the clockwise sense as one proceeds in a positive sense along the Z axis.

The pole pieces support the transverse magnetic field in the following manner. The first pole piece to the left of FIG. 3 is the lower pole piece 24 cooperating with the unillustrated upper member of a vertical pole piece pair to support a downwardly directed ($-\hat{Y}$) transverse field. The transverse field vector at the location in the X-Y plane, coplanar with 24 bears a reference number 29. The next pole piece, progressing 90° in spatial phase in the $+Z$ direction, is the back member 27 of a horizontal pole piece pair which cooperates in establishing a transverse field directed away from the viewer ($+\hat{X}$) in a horizontal plane. The corresponding field vector bears a reference number 32. At the next 90° interval, a second lower pole piece 25 is shown, one of a vertical pole piece pair cooperating to establish an upwardly directed ($+\hat{Y}$) transverse field as illustrated by the vector 30. The next pole piece 90° further along the Z axis, is the back member 28 of a horizontal pole piece pair cooperating to establish a field in the horizontal pole direction, toward the viewer ($-\hat{X}$) as represented by the arrow 33. The magnetic period (360° spatial phase) is complete with the vertical pole piece pair 23, 26 which support a downwardly directed ($-\hat{Y}$) field as illustrated by the vector 31. A last horizontal pole piece pair is shown at 34, 35 which establishes a magnetic field in a direction away from the viewer ($+\hat{X}$) and which is spaced 90° further along the Z axis from the vertical pole piece pair 23, 26.

Rotation of the circularly polarized transverse magnetic field is approximately smooth, and not stepwise, as one proceeds along the Z axis. The seven sample transverse field orientations discussed above and produced by the five pole piece pairs arranged at 90° intervals suggests the circularly polarized transverse magnetic fields exist at 90° intervals provided the adjacent orthogonal pole piece pairs are disposed at mutual nulls.

The pole pieces of the horizontal pairs are arranged midway along the Z axis between the pole pieces of the vertical pairs (and vice versa). The fields of the vertical pairs vary from the $-\hat{Y}$ to $+\hat{Y}$ direction as a symmetrical function of Z as do the fields of the adjoining horizontal pairs which vary from the $-\hat{X}$ to $+\hat{X}$ direction as a symmetrical function of Z. Thus, at a Z coordinate midway between the vertical pole piece pairs the vertical field is zero and the horizontal field is a maximum (and vice versa). From this one may conclude that the transverse field vectors are in the correct rotational phase at the 90° sample positions.

Furthermore, mathematical and observational considerations provide further support for the regularity and continuity of the rotation of the transverse magnetic field. The field produced by the magnetic pole pieces of the vertically paired pole pieces is observed to be approximately sinusoidal in the Y-Z plane. This arises in part from the use of pole pieces which are thin in relation to the spacing between adjacent pairs leading to a greater field concentration at the plane of the pole piece pair and quite gradual axial reduction to zero in transverse field density midway between the pole piece pairs. Assuming that vertical pole piece pairs whose field vectors lie in the YZ plane are axially displaced 90° in magnetic period from the horizontal pole piece pairs, whose field vectors lie in the XZ plane, then the customary requirements for generating a smoothly rotating or circularly polarized magnetic field are met. This conclusion is supported by observation.

FIG. 4 is a vertical section of the vertically paired (+Y, −Y) elements of the magnetic structure taken in the YZ plane and showing both magnets and pole pieces and the fields they produce. Restated, FIG. 4 shows both the transverse fields produced by the vertical elements together with the axial fields producing the vertical elements. FIG. 4 also shows the magnet shunting elements for tapering both fields in the vicinity of the beam entrance tunnel 15, which will be discussed later. The magnets 40-44 in the upper (+Y) row and the magnets 45-49 in the lower (−Y) row are polarized in a direction parallel to the Z axis in either a positive or negative orientation. More particularly, in the upper (+Y) row the magnets 40, 42 and 44 have +Z (N pole to the right) orientations and magnets 41, 43 have −Z (N pole to the left) orientations. In the lower (−Y) row, the magnets 45, 47 and 49 have −Z orientations and the megnets 46, 48 have +Z orientations. The vertical pole piece pairs 51, 57; 53, 59; and 55, 61 support a transverse magnetic field in the $+\hat{Y}$ direction (upward) while the vertical pole piece pairs 52, 58; 54, 60; and 56, 62 support a transverse magnetic field in the $-\hat{Y}$ direction (downward). These field orientations are consistent with a tranverse magnetic field having a period equal to twice the axial interval between pole pieces as earlier described. Additional description of the magnetic structure and the axial focusing fields will be postponed until after a description of the electron beam, whose envelope is shaped in response to the transverse field.

Figure 5A:
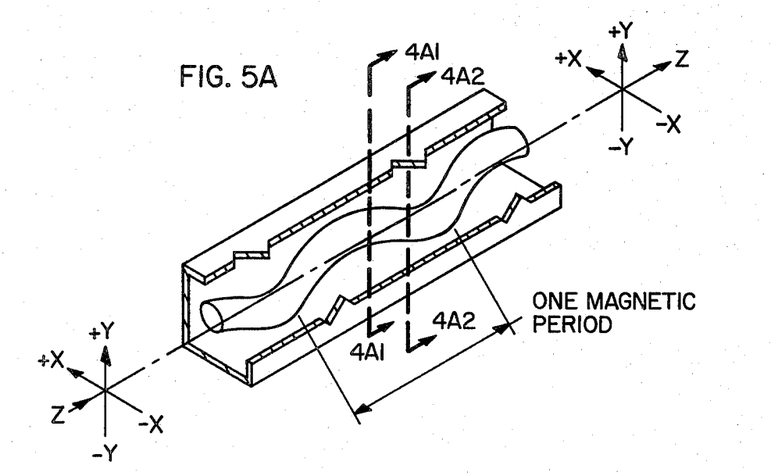
FIGS. 5A, 5B and 5C are views of the electron beam illustrating the helical form imparted to the beam by the transverse magnetic field, FIG. 5A being a perspective view and FIGS. 5B and 5C being sectional views.
Figure 5B:
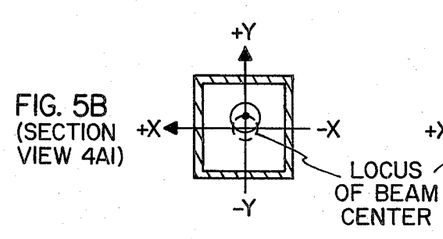
Figure 5C:
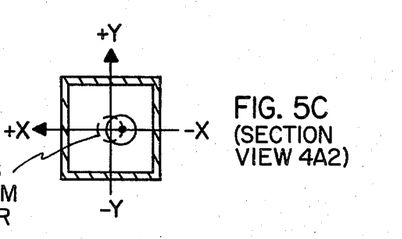

The circularly polarized transverse magnetic field ideally produces a helically shaped beam as illustrated in FIGS. 5A, 5B and 5C. The reality of the helical shape departs from the ideal primarily due to defocusing effects which are largely corrected by the axial fields. The circularly polarized transverse magnetic field produces a known helical motion of the individual electrons whose collective motions define the beam envelope. The deflection force on electrons in a magnetic field is orthogonal to that field and to their velocity vectors. Accordingly, the circularly polarized transverse magnetic field deflects the individual electrons into a helical path which is orthogonal to (or displaced 90° in magnetic period) to the magnetic field. Restated, all electrons ideally travel is similar helical paths with no relative lateral motion between electrons at the same axial position in the beam. The helical path of the individual electrons is fixed in space, and the helical configuration of the overall beam envelope is also fixed in space, and has the shape illustrated in FIG. 5A. As shown in FIGS. 5B and 5C, any cross-section of the beam taken orthogonal to the Z axis is approximately circular with the center of the cross-section rotating clockwise about the Z axis as one advances along the Z axis. The beam cross-section has a progressive Z dependent rotation about the waveguide axis, but there is no rotation (Z dependent or otherwise) of the cross-section of the beam about its own center. The locus of beam centers lies in a cylindrical surface which is centered on the Z axis.

The helical beam envelope depicted in FIG. 5A may also be visualized as a strand of twisted rope or as a modified cylindrical wire helix. In the latter visualization, the shape is that resulting when a large diameter wire coiled in a helix on a small diameter spool is removed from the spool, and axially extended to reduce the inner diameter of the helix. The process of extension is continued past the point where the inner diameter of the helix is zero (and the axis is clear) to the point where the innver diameter of the helix has negative values (and the axis at all times lies within the cross-section of the wire). The resultant shape is herein referred to as "helical", a term which is intended to embrace both the more conventional example where the axis is clear and the less conventional example where the axis is obstructed by the winding cross-section. Depending upon application, the beam may assume the helical form of either example. In the present apparatus, the beam cross-section is 1–2 mm in diameter with a radius of typically 0.1 mm for the locus of the beam center. The spatial period of circular rotation of the beam about the Z axis is equal to the period of the transverse magnetic field.

The circularly polarized transverse magnetic field produces helical motion of the individual electrons and the beam constituted by such electrons, and the axial magnetic field produces a focusing action upon the individual electrons and the beam so constituted. The axial field, its composition and the focusing action, which it produces upon the beam, will now be described.

The axial field is a composite field composed of a fourfold plurality of short axial fields, each plurality being identified with one of four quadrants surrounding the waveguide. The short axial fields are each due to axially adjacent pole piece pairs in the same quadrant. After a discussion of the disposition and creation of the short axial fields, it will be shown that they may be regrouped to form a twofold plurality of helically configured composite fields, each plurality possessing a similar (righthand or lefthand) rotational symmetry to the transverse field and by inference rotational symmetry to the electrons in their individual helical orbits. In other words, at a given Z displacement the axial field at a 12 o'clock position will be +Z and at a 6 o'clock position −Z. At a quarter magnetic period further along the Z axis, the +Z axial field will have rotated to the 3 o'clock position and the −Z axial field will have rotated to the 9 o'clock position, and so on.

Figure 6:
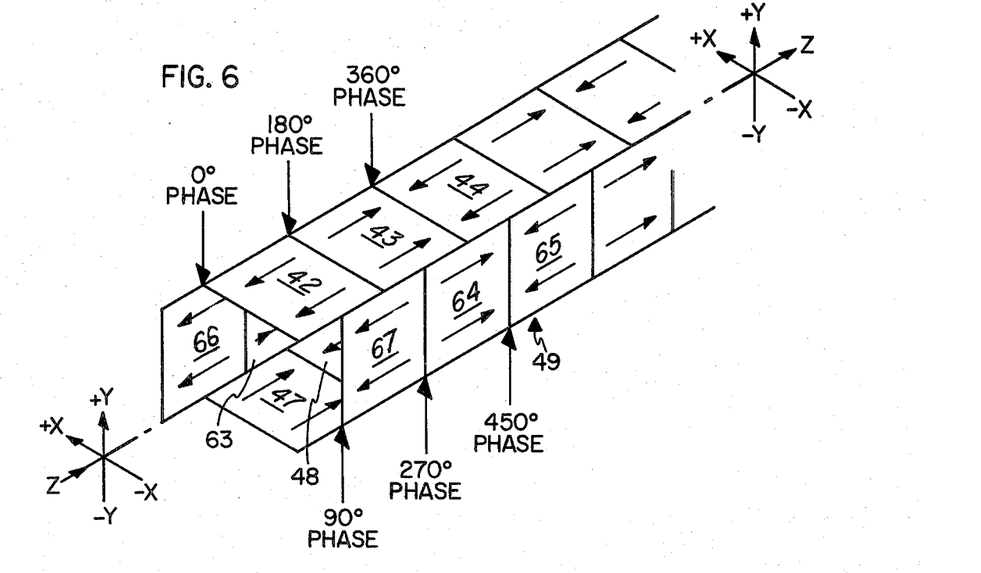
FIG. 6 is a perspective view of the two intertwined helical axial fields.

The disposition and creation of the short axial fields, occurring along the four quadrants of the waveguide interior, are explained by reference to FIGS. 4 and 6. The disposition of the short fields is illustrated in the isometric projection of FIG. 6. The XYZ coordinate convention employed in the prior figures is retained. The magnet and pole piece positions, which create the short axial fields are shown in FIGS. 2, 3 and 4. In FIG. 6, the short axial fields, and the pole pieces which create them are identified by reference numerals consistent with those applied to FIG. 4. More particularly, the axial fields attributable to the magnets 42, 43, 44, respectively, are shown on the upper inner surface of the waveguide and bear numbers listed progressively in the +Z direction. The axial fields of the lower magnets are only partially depicted, the field for magnet 47 being nearly fully shown, while that of magnet 48 is largely hidden and that of 49 completely hidden. The axial fields of previously unnumbered horizontally paired (at +X, −X positions) magnets are shown, respectively, at 66, 67, 63, 64 and 65. The (−Z) axial field corresponding to a magnet 61 at the leftmost back position (+X) is shown offset 90° in the −Z direction from the leftmost axial fields of magnets 42 and 47. A zero phase coordinate in the magnetic period is identified in FIG. 6 as occurring at the coordinate of the pole pieces 53, 59 (approximately at the left edge of magnets 42, 47). Progressing further in the +Z direction, the axial field corresponding to a magnet 63 at the back (+Z) position is shown offset 90° in the +Z direction from the axial field of magnets 42 and 47. The axial field corresponding to a magnet 67 at the front (−X) position is shown opposite the magnet 63. Continuing in the +Z direction along the front (−X) positions of the interior wall, positions bearing numbers 64 and 65 are shown next. A 180° phase coordinate in the magnetic period occurs approximately at the right edge of magnets 42, 47. A 360° phase coordinate of the magnetic period occurs approximately at the left edge of magnet 44. The 90°, 270° and 450° phase coordinates occur approximately at the left edge of magnets 67, 64 and 65, respectively. As will be shown, one may interpolate to find the axial fields at coordinates intermediate to the 90° intervals. If one adds the axial field vectors at 45°, 135°, 225° and 315° Z axis coordinates in the XY plane, due to axial pole piece pairs in adjacent quadrants, one will find that the resultant axial field vector (+Z, −Z) has rotated with the axial (or phase) coordinate at the same rate as the other sample coordinates. In practice, the Z dependent rotation of the axial field vectors has been observed to be continuous at an approximately constant rate.

The short axial fields indentified above as members of one of four pluralities of axial fields, each plurality being identified by quadrant, may be regrouped into two groups of composite axial fields having rotational symmetry as earlier suggested. The two new groups may be analogized to a rope having the strands twisted in the clockwise (in the present example) direction as one proceeds in the $+\hat{Z}$ direction. One strand has a $-\hat{Z}$ direction and the other strand has a $+\hat{Z}$ direction. Applied to the magnet positions shown in FIG. 6, the $-\hat{Z}$ composite axial field has a continuous clockwise Z dependent rotation as one proceeds through the positions 66, 42, 67, 48. The sequence goes out of sight and reappears with the magnet positions 44 and 65. The $+\hat{Z}$ composite axial field also has a continuous clockwise dependent rotation. The +Z sequence includes the magnet positions 47, 63, 43 and 64, respectively.

Figure 7:
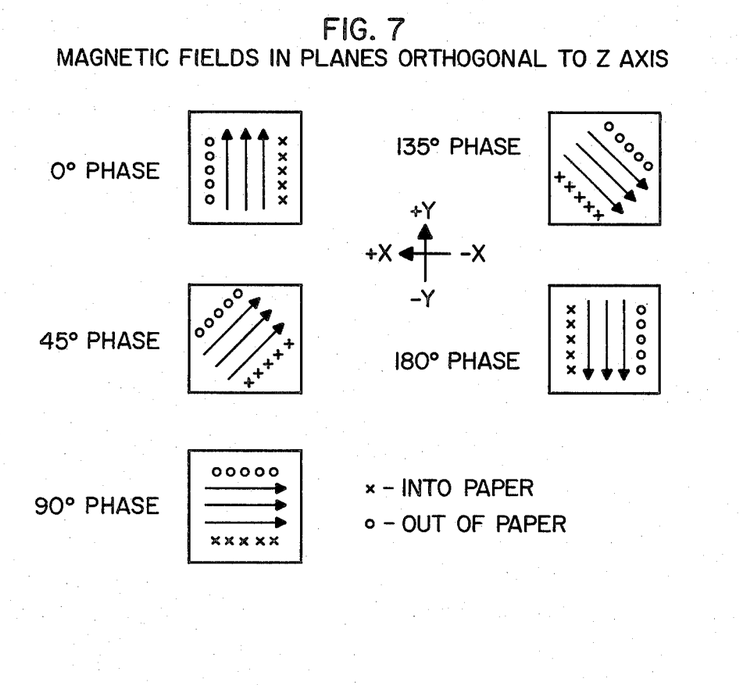
FIG. 7 is a view of the magnetic fields taken in planes orthogonal to the waveguide axis at 45° intervals of a magnetic period. The view is designed to show the continuous Z dependent rotation of the transverse and axial fields.

The description of the topography of the transverse and twofold composite axial magnetic fields is completed by reference to FIG. 7, which supplements and consolidates the field descriptions in FIGS. 3, 4 and 6. FIG. 7 shows the rotation of both the transverse magnetic field vectors and axial field vectors at 45° phase intervals in planes orthogonal to the Z axis over a 180° magnetic period. The figure shows arrows representing the transverse field vectors extending across a cross-section of the waveguide with the arrows representing $+\hat{Z}$ and $-\hat{Z}$ axial field vectors distributed around the interior of the waveguide shown in an end-on view extending into or out of the paper, respectively. Having discussed the twofold axial focusing fields, we will now take up the beam, and the need for focusing.

A primary defocusing mechanism in the beam is due to the mutual repulsion (space charge force) of the electrons in the beam, which causes the beam to expand at a finite rate when the beam velocity is at conventional values (substantially less than the speed of light). There are secondary defocusing factors, of which one occurs with the radiation of electromagnetic energy from the individual electrons as they pursue circular orbits in the magnetic field. The radiation of electromagnetic energy in turn causes a decrease in electron velocity and an increase in the orbital diameter. These and other defocusing mechanisms are compensated for by the provision of two spiral axial fields described above, acting on any tangential velocity component relative to the center of the waveguide. The two spiral fields are in a sense to direct all non-central electrons having a tangential velocity component back toward the waveguide axis. As further discussion will show, the electrons in the XZ plane being deflected during a given time interval long their helical orbits by the transverse fields of magnets in the YZ plane are simultaneously focused by the axial fields of magnets in the XZ plane. Similarly, electrons in the YZ plane being deflected during a given time interval along their helical orbits by the transverse fields of magnets in the XZ plane are simultaneously focused by the axial fields of magnets in the YZ plane. Electrons in intermediate planes are focused by the vector sum of the axial fields from sets of magnets in adjacent quadrants as stated earlier. The focusing operation will be treated analytically after additional description of the means by which the axial fields are created.

The magnetic structure which produces both the circularly polarized transverse magnetic field and the spiral +Z and −Z axial fields, will now be treated in greater detail. The FIG. 4 illustration is a section view of the magnetic structure including both magnets and pole pieces with the waveguide (12) removed. The inner surfaces of the magnets 40–44, and associated pole pieces 51–56, are substantially coplanar and the inner surfaces of the magnets 45–49, and the associated pole pieces 57–62, are substantially coplanar and in contract with the upper and lower surfaces, respectively, of the waveguide. Magnetic flux enters the waveguide via the pole pieces, which are designed to minimize leakage flux around those edges of the magnet not adjacent to the waveguide. As illustrated in FIG. 4, flux from each N (north) pole piece enters the interior of the waveguide where it divides between the S (south) pole piece directly across the waveguide to provide a transverse field and the adjacent S pole pieces on the same side wall, to provide two short axial fields. (The term N or S pole piece has been used to characterize that the pole piece is attached to the N or S pole respectively of a magnet. The N pole of the magnet is taken to be the end from which the magnetic flux emerges. In FIG. 4, it is denoted by the head of the polarization arrow.)

Continuing with a description of the axial focusing fields; the axial fields between successive adjacent pole pieces along the same wall of the waveguide alternate in direction ($+\hat{Z}$, $-\hat{Z}$, $+\hat{Z}$, $-\hat{Z}$, etc.) and the axial fields on opposing segments of wall are oppositely sensed. More particularly, an axial field having a $+\hat{Z}$ direction exists in proximity to the lower ($-Y$) wall of the waveguide between the pole pieces 57, 58; 59, 50; and 61, 62. Similarly an axial field having a $-\hat{Z}$ direction exists in proximity to the lower ($-Y$) wall of the waveguide between the pole pieces 58, 58 and 60, 61. In proximity to the upper ($+Y$) wall of the waveguide, the axial fields between the pole pieces 51, 52; 53, 54 and 55, 56 have a $-\hat{Z}$ direction while the axial fields between the pole pieces 52, 53; 54, 55 have a $+\hat{Z}$ direction.

The $+\hat{Z}$ and $-\hat{Z}$ axial focusing fields are continuous through positions within the waveguide intermediate to the planes of the vertical and horizontal pole pieces. For instance, assuming a square waveguide is involved, the axial focusing fields continue through a plane perpendicular to the Z axis and embracing a line taken through a diagonal of the cross-section. In the diagonal plane, the field remains substantially axial with one axially adjacent vertical and one axially adjacent horizontal pole piece pair contributing to the field in differing degrees as one proceeds parallel to the Z axis. At one point along the magnetic phase coordinate, the adjacent vertical pole piece pair alone will provide the axial field and at another point the adjacent horizontal pole piece pair alone will provide the axial field. At other positions both adjacent pole piece pairs will contribute, sometimes additively and sometimes subtractively to the resultant axial field. In short, the axial field in the diagonal plane will have a Z dependency at the same periodicity as the axial field in a primary plane (either vertical or horizontal. In addition, the axial magnetic field vector will reach a maximum when both adjacent Z vectors are at angular positions midway between the 0° and 90° position in the magnetic phase coordinate. At the odd multiples of the 45° coordinate (i.e., in the diagonal planes), the axial vector sum is theoretically 0.707+0.707 or 1.414 and is a maximum. Thus, the rate of Z dependent rotation of the $+\hat{Z}$ or $-\hat{Z}$ axial fields is constant through the diagonal planes and in phase with the rotation in the other planes.

The maximum axial field strength in a diagonal plane as seen by electrons at constant distances from the waveguide axis may differ from those in XZ or YZ planes but it appears to have little practical effect. The axial fields are strongest at greater distances from the axis, weaker near the axis, and zero on the axis. Thus, the focusing effect is weaker on electrons near the axis and stronger on electrons remote from the axis. Experience and calculations have shown that the focusing effect of the axial field is sufficiently continuous for all positions radially disposed around the axis to cause the beam to maintain an approximately circular cross-section as shown in FIGS. 5A, 5B and 5C.

The same pole piece arrangement provides both transverse deflecting and axial focusing fields. The radial focusing force is the cross product of the axial magnetic field with the tangential component of the electron velocity and lies in the transverse plane. When the electron moves in a helical orbit under the influence of the transverse magnetic field, it experiences this focusing force. The tangential velocity of the electron is greatest where the transverse field is oriented perpendicular to the mean displacement vector of the electron orbit relative to the center of the waveguide. For instance, the axial fields which are illustrated in FIG. 3 are those produced by vertical ($\pm Y$) pole piece pairs. In principle, the axial fields of the vertical ($\pm Y$) pole piece pairs focus the beam, simultaneous with its deflection by the transverse field of the horizontal ($\pm X$) pole piece pairs (not illustrated). The horizontal pole piece pairs precede the vertical ($\pm Y$) pole piece pairs along the Z axis by one-quarter of the magnetic period. Similarly, as the beam is deflected by the transverse fields of the illustrated vertical ($\pm Y$) pole piece pairs, focusing is achieved by the axial fields of the horizontal ($\pm X$) pole piece pairs which are separated from the vertical pole piece pairs by one-quarter of the magnetic period.

The focusing action may be treated mathematically. The axial fields on all four quadrants contribute usefully to refocusing the electron beam. If the orbital motion of an individual electron is small relative to the diameter of the beam, so that the electronic orbit remains in proximity to one (or two) adjacent side walls of the waveguide, then only the axial fields of that side wall (these side walls) will contribute substantially to refocusing that electron. The resulting focus force on an electron in a helical path is periodic and always has a component directing the electron toward the Z axis for non-zero radial positions. As earlier noted, the transverse field is maximum at the Z coordinate of the pole pieces and reaches a null midway between axially successive pole pieces. The transverse field continues from the near wall, through the axis, to the far wall of the waveguide with a width extending substantially from side wall to side wall. The axial field on the other hand, since axial fields on opposing walls are of opposite sense, is zero on axis and greatest in proximity to the walls.

A calculation of the force acting on an electron in an off-axis position shows that the force will always have a center directed component if the electron orbit is a helical path in the correct sense in relation to the axial fields. The center directed component of force on the electron will reach a maximum twice per magnetic period and between the maxima go to zero, avoiding outwardly directed values. The magnitude of the focusing force is smaller than the force components causing the basic helical motion, and acts slowly, with the focusing force acting on a sample electron for typically 10 periods to reverse its radial drifting motion.

Calculation shows that electrons rotating in a spiral orbit whose radius is small (typically 0.1 mm) in relation to the transverse dimensions of the waveguide and moving toward the viewer horizontally ($-\hat{X}$) in mid-magnet positions (i.e., at the Z coordinate of the magnet center and in the YZ plane) near the upper ($+Y$) or lower ($-Y$) walls of the waveguide will be subject to a force in the XZ plane exerted toward the Z axis. The electron group near the upper ($+Y$) surface of the waveguide (using the FIG. 3 orientations) will experience a $+Z$ axial magnetic field of a mid-magnet 41 position, and will be be deflected in a ($-\hat{Y}$) direction. The electrons near the lower ($-Y$) surface of the waveguide at a mid-magnet 46 position will experience a $-Z$ axial magnetic field and will be deflected in a ($+\hat{Y}$) direction. Noting their positions in relation to the Z axis, both electrons experience forces having a center directed component (i.e. are in a focusing sense).

Calculations show that a null of the focusing force exerted by the axial field upon this set of electrons pursuing their helical paths occurs as they reach the Z coordinate of the pole piece pair (53, 59). At this coordinate, both (+Y and −Y) electron groups momentarily have a transverse velocity component in the (−Ŷ) direction in an axial field which is zero.

At the next mid-magnet (42, 47) positions, both (+Y and −Y) electron groups rotating in their small spiral orbit, are moving away from the viewer horizontally (+X̂). The electron at mid-magnet 42 position at the upper (+Y) surface of the waveguide will experience a −Z axial magnetic field, and be deflected in a (−Ŷ) direction. The electrons at mid-magnet 47 position at the lower (−Y) surface of the waveguide will experience a +Z axial magnetic field, and be deflected in a (+Ŷ) direction. Here also, the forces on both electrons have a center directed component (i.e., are in a focusing sense).

Calculations also show a null of the focusing force exerted by the axial field upon these electrons occurs as they reach the Z coordinate of the next pole piece pair (54, 60).

The foregoing discussion has been carried out by determining the orientations of the axial field and electron velocity vectors for two electron groups near the +Y and −Y waveguide surfaces. The orientations have been determined at four positions along the Z dimensions at 90° intervals in the magnet period. The discussion has also been limited to a sequence of the focusing of two successive vertical (±Y) pole piece pairs. The symmetry of the magnetics allows the successive horizontal (±X) pole piece pairs to exhibit the same focusing effect on electrons which are displaced from the center in a ±X direction except that the peaks of the force occur in the plane where the ±Y displaced electrons experience a null of the focusing force. The symmetry also indicates that all axial fields may contribute to focusing. In general because the entire field rotates as a function of Z as shown in FIG. 7, all the particles at a given radius from the center of the beam experience the same magnetic force, although the phase of these forces varies with the azimuthal position of the electron in the beam. The prior discussion has also treated the existence of axial focusing fields at the waveguide corner regions. In short, the focusing effect is general around the perimeter of the waveguide interior. The beam, when kept near the center of the waveguide interior, will not experience the stronger axial field, but will when it approaches the waveguide walls.

The helical electron orbits will practically always be in the correct synchronism for focusing the axial fields. These individual orbits are generally of small radius relative to the size of the waveguide, so that the magnitude of the periodic axial field as seen by a given electron stays essentially the same. When the mean position of the orbit drifts toward the walls of the waveguide under the influence of space charge forces, the electron encounters a more intense axial field, causing an increased focusing force toward the center of the waveguide which over several periods will counteract the average outward velocity of the electron and impart an average inward velocity. Thus, assuming the usual helical electron motion, the inward focusing force described above is a function of the mean radial position of the electron, being zero at the center of the waveguide, and increasing as the electron approaches the waveguide wall. The space charge force on an electron near the surface of a beam is largest when the beam is small. This force, on an electron near the surface, decreases as the beam enlarges. Eventually the growing inward focusing forms will exceed the decreasing outward space charge force and eventually change the mean outward velocity of the electron to an inward velocity. As the electron, always following its helical orbit, moves toward the center of the waveguide, the focusing force will be greatly reduced, and the space charge force will eventually increase as a function of position within the beam, finally giving the electron an average outward velocity.

In summary, any electron, always traveling in a helical orbit over many periods, may experience an alternating outward and then inward average velocity. This may occur as it experiences a relatively slow alternation in the net average direction of the sum of the opposing space charge and focusing forces, which are dependent on the mean position of the electron in the beam and in the waveguide. The period and extent of this motion will differ among electrons depending on their initial position within the beam. Since all electrons do not experience the same degree of focusing at the same time, the effect of the individual excursions on the overall beam envelope is largely smoothed out, although the electron flow within the beam is not completely laminar. The length of the tapered magnetic field region at the electron gun end of the magnetic structure can be adjusted to reduce the extent of these excursions and the resulting beam diameter variation.

There are several practical considerations in maintenance of proper focusing of the beam in this conservative system. As pointed out earlier, if the beam expands too steeply, it will be made to converge steeply. Steep convergence is always followed by steep divergence. The process of beam convergence-divergence is a conservative one which will continue to take place along the axis of the interaction structure. In general, it should be held to a minimum. To avoid the problem, the beam should be carefully aligned with the axis of the waveguide as it enters the waveguide. In addition, the interaction structure should exhibit a gradual increase in the fields (as illustrated in FIG. 4) as the beam enters the structure. This reduces the eventual turbulence in the beam. In practice, the focusing and defocusing forces cannot be exactly matched. Experience has indicated that the limits can be extended by careful design and approximate matching of the opposing forces. Using present geometry and materials an interaction region of at least 60 magnetic periods is practical.

The magnetic structure best illustrated in FIG. 4 is designed to be held within a tight, cylindrical enclosure as illustrated in FIG. 1 with radial spacers inserted between the individual quadrants. The enclosure and spacers, which are non-magnetic, are designed to prevent the magnetic structure from misalignment under the cumulative repulsive forces acting between individual magnets.

The best magnet materials for use in this device are those having a high coercive force, such as the rare-earth cobalt magnetic alloys. The radius of the enclosure is dimensioned to assure a good fit to the parts inside.

The magnetic structure is designed for efficient coupling of the magnetic field into the waveguide. The inner edges of the pole pieces are arranged coplanar with the inner surfaces of the permanent magnets along the waveguide walls in order to increase the (axial) flux passing into the interior of the waveguide and away from the inner surfaces of the encircling magnets. The outer edges of the pole pieces do not extend as far outward as the outer edges of the permanent magnets, to reduce the shunt flux flowing around the outer perimeter of the permanent magnets. This design practice increases the flux in the edge adjacent the waveguide. For similar reasons, the external enclosure and spacers should be of a non-magnetic material.

The geometry of the magnetic structure is proportioned to provide a maximum transverse magnetic field and insure adequate beam focusing in the approximately (5 mm×5 mm) magnetic interaction region of the waveguide, in the interests of operating efficiently. The transverse pole piece separation in the 35 gigahertz example is equal to the outside dimensions (6 mm×6 mm) of the waveguide. The magnetic period is approximately 7 mm, giving an adjacent pole piece separation of 3.5 mm. These dimensions give a ratio between axial pole piece spacing and transverse pole piece spacing of approximately one to two. With these proportions, the on-axis transverse field is approximately 1 kilogauss.

In general, the transverse field increases strongly as a function of this ratio. If this ratio is made smaller, the transverse field will be reduced since most of the available flux will follow the axial path, and the electron beam will not exhibit the desired amount of transverse motion. If this ratio is too high, the transverse field in each plane will no longer be nearly sinusoidal as a function of Z, and the axial fields will be reduced. A reduced period is desirable in order to build a tube which operates with a lower beam voltage, but this reduction is limited by the ability of the magnets to create an adequate transverse field which is necessary for useful RF gain in the device.

While a square waveguide has been shown, the magnetic structure may also be employed with waveguides of the differing cross-sections which support a circularly polarized wave, such as circular waveguides.

What is claimed as new and desired to be secured by Letters Patent of the United States is:

1. In an electron discharge device in which high speed electrons in a beam, subjected to a spatially periodic magnetic field, pursue helical paths, the deceleration of said electrons producing electromagnetic energy at a given frequency, the combination comprising:
   (1) a waveguide having a given phase velocity for waves of said given frequency and a low frequency cut-off below said given frequency.
   (2) an electron gun for projecting a beam of electrons along the axis of said waveguide at a given velocity, the beam being subject to defocusing forces,
   (3) means for producing a circularly polarized transverse magnetic field extending across the interior of the waveguide, the transverse field vector rotating about said waveguide axis at a given pitch which causes the electrons in said beam to pursue helical paths about axes parallel to said waveguide axis and rotating with a pitch equal to that of said transverse field but mutually displaced by one-quarter rotation,
   the electron velocities, the spatial periodicity of said helical paths, and said waveguide parameters being selected to cause a deceleration of said electrons and an increase of electromagnetic energy of said given frequency in said waveguide, and
   (4) focusing means for producing a first and a second circularly polarized axial magnetic field, each rotating about said waveguide axis at a pitch equal to that of said helical electron paths, said first circularly polarized axial field having a polarization opposite to that of said second circularly polarized axial field, the two circularly polarized axial fields being interwined and disposed at mutually opposite positions across the axis of the waveguide to cause the maximum axial field at a given axial coordinate to assume opposite senses at opposite points on the perimeter of said waveguide and a zero value on the waveguide axis, the electrons at said given axial coordinate sharing a common transverse vectorial velocity, of which those lying in two sectors oppositely disposed across said axis are subject to a maximum deflecting force,
   the axial field having a rotational sense in relation to that of said electron paths such that said maximum deflecting force is inwardly directed for electrons in both sectors, off-axis electrons in all sectors of said beam being periodically exposed to said maximum inwardly directed force as the beam progresses along said axis, whereby all electrons in said beam experience periodic maximum focusing forces, and beam impingement on the interior of said waveguide substantially prevented.

2. The combination set forth in claim 1 wherein said means for producing said circularly polarized transverse and axial magnetic fields is a plurality of magnetic elements disposed about said waveguide perimeter and in axial succession, sufficient in number to produce a plurality of complete rotations in said helical electron path.

3. The combination set forth in claim 2 wherein said means for producing said circularly polarized transverse and axial magnetic fields is a plurality of magnetic elements arranged in an even number greater than three of axially extending rows, disposed about the perimeter of said waveguide.

4. The combination set forth in claim 2 wherein said means for producing said circularly polarized transverse and axial magnetic fields is a plurality of magnetic elements comprising a plurality of magnetic poles arranged in four axially extending rows disposed about the perimeter of said waveguide, the poles in each of said four rows being arranged in an alternating succession of polarities, the poles of a first row being axially aligned opposite to poles in a third row having mutually opposite polarities, and the poles in a second row being axially aligned opposite to the poles in the fourth row having mutually opposite polarities, said transverse magnetic field being supported by poles disposed at mutually opposite positions across said axis and said axial field being supported by flux between adjacent poles in a common row.

5. The combination set forth in claim 4 wherein the poles in said second and fourth rows are arranged at axial coordinates intermediate to those of the poles in said first and third rows, said arrangement causing said transverse field vector to assume a clockwise (or counterclockwise) rotation about said waveguide axis and said first and second axial fields to assume similar clockwise (or counterclockwise) rotations about said waveguide axis.

6. The combination set forth in claim 5 wherein said magnetic elements in each row consist of an alternating sequence of permanent magnets and pole pieces, said magnets having their poles aligned parallel to said waveguide axis in an alternating sense; said pole pieces coupling flux from said magnets into said waveguide, said sequence of magnetic elements in each row commencing and ending with a pole piece.

7. The combination set forth in claim 6 wherein the magnets and pole pieces in each row substantially occupy a quadrant whose center is the axis of said waveguide, the inner surfaces of said pole pieces and magnets being substantially coplanar and in close proximity to the exterior of said waveguide, said configuration reducing the leakage of axial flux outside of said waveguide and increasing the axial flux flowing within the proximate interior of said waveguide.

8. The combination set forth in claim 7 wherein the non-inner surfaces of said pole pieces are set back within the outlines of said magnet to reduce the amount of axial leakage flux at non-inner surfaces.

9. The combination set forth in claim 6 wherein means are provided to gradually increase said transverse and axial fields in proximity to said electron gun to minimize turbulence in said electron beam.

10. The combination set forth in claim 8 wherein magnetic shunts are provided on the non-inner surfaces of said magnets in proximity to said electron gun to effect a gradual increase in transverse and axial fields to minimize turbulence in said electron beam.

* * * * *